United States Patent
Fowler et al.

[11] Patent Number: 5,875,410
[45] Date of Patent: Feb. 23, 1999

[54] DYNAMIC BEST GEAR SELECTION FOR AUTOMATED TRANSMISSION SYSTEM

[75] Inventors: Paul Martin Fowler, Lymm; Anthony Stasik, Coppull; Robert Stanley Wheeler, Preston, all of England

[73] Assignee: Eaton Corporation, Cleveland, Ohio

[21] Appl. No.: 773,123

[22] Filed: Dec. 26, 1996

[30] Foreign Application Priority Data

Jan. 12, 1996 [GB] United Kingdom .................... 9600674
Feb. 6, 1996 [GB] United Kingdom .................... 9602362

[51] Int. Cl.[6] ........................................................ G06G 7/70
[52] U.S. Cl. ................................ 701/64; 701/51; 701/52; 701/61; 477/78
[58] Field of Search ................................ 701/51, 52, 53, 701/54, 64, 61; 477/37, 46, 48, 75, 78, 80, 142, 144, 900, 901; 74/335, 336 R

[56] References Cited

U.S. PATENT DOCUMENTS

| | | | |
|---|---|---|---|
| 4,648,290 | 3/1987 | Dunkley et al. | 477/80 |
| 4,930,078 | 5/1990 | Dunkley et al. | 701/64 |
| 5,385,515 | 1/1995 | Chan et al. | 477/75 |
| 5,406,862 | 4/1995 | Amsallen | 477/78 |
| 5,415,604 | 5/1995 | Bates et al. | 477/78 |
| 5,416,700 | 5/1995 | Bates et al. | 701/52 |
| 5,459,658 | 10/1995 | Morey et al. | 701/56 |
| 5,506,771 | 4/1996 | Chan et al. | 701/54 |
| 5,527,237 | 6/1996 | Fowler et al. | 477/142 |
| 5,577,978 | 11/1996 | Stasik et al. | 477/78 |
| 5,592,851 | 1/1997 | Bates et al. | 74/336 R |
| 5,611,245 | 3/1997 | McKee | 74/336 R |
| 5,664,458 | 9/1997 | Stasik et al. | 74/336 R |
| 5,706,197 | 1/1998 | Stasik et al. | 701/52 |

Primary Examiner—Jacques H. Louis-Jacques
Attorney, Agent, or Firm—Howard D. Gordon

[57] ABSTRACT

A control system and method for a semi-automatic mechanical transmission system (10) is provided for allowing operator request for direct shifts into a preselected default start ratio ($GR_{DS}$) or into a dynamic best gear ratio ($GR_{DB}$) under certain predefined conditions. The dynamic best gear ratio, under at least certain vehicle operating conditions, is the higher of a test best gear ratio ($GR_{TB}=ES_{TARGET}/OS$), determined as a function of vehicle speed (OS) and a target engine speed ($ES_{TARGET}$), or the default start ratio.

25 Claims, 3 Drawing Sheets

DYNAMIC BEST GEAR SELECTION FOR AUTOMATED TRANSMISSION SYSTEM

BACKGROUND OF THE INVENTION

RELATED APPLICATIONS

This application is related to U.S. patent applications, Ser. Nos. 08/329,818 filed Oct. 27, 1994 now U.S. Pat. No. 5,761,628, and 08/511,122 filed Aug. 4, 1995, both assigned to the assignee of this application, EATON CORPORATION. This application is related to British Patent Applications No. 9600674.7 filed Jan. 12, 1996, and No. 9602362.7 filed Feb. 6, 1996, both entitled DYNAMIC BEST GEAR SELECTION FOR AUTOMATED TRANSMISSION SYSTEM.

FIELD OF THE INVENTION

The present invention relates to control systems/methods for selecting a dynamic best gear ratio for current vehicle dynamic operating conditions in fully or partially automated vehicular transmission systems. In particular, the present invention relates to a control system/method for selecting a dynamic best gear ratio for dynamic operating conditions in a vehicular automated transmission system having a plurality of possible start ratios and a predetermined default start ratio.

More particularly, according to the present invention, a trial best gear ratio is calculated according to current vehicle operating conditions and is compared to the current default start ratio. In one embodiment of the present invention, the dynamic best gear ratio will be the higher of the trial best gear ratio and the default start ratio while, in another embodiment of the present invention, under a first set of conditions, the dynamic best gear ratio will be the trial best gear ratio, and in another set of conditions, the dynamic best gear ratio will be the higher of the trial best gear ratio and the default start ratio.

DESCRIPTION OF THE PRIOR ART

Fully automatic transmission systems, both for heavy-duty vehicles such as heavy-duty trucks and/or coaches, and for automobiles, that sense various control parameters such as throttle openings or positions, vehicle speeds, engine speeds, and the like, and automatically shift the vehicle transmission in accordance therewith are well known in the prior art. Examples of such transmissions may be seen be reference to U.S. Pat. Nos. 3,961,546; 4,081,065; 4,361,060; 5,050,079 and 5,109,729, the disclosures of which are incorporated herein by reference.

Semi-automatic and partially automated mechanical transmission controls are known wherein automatic changing between a plurality of gear ratios is provided while normally permitting the driver to choose when to make a particular gear ratio change, whether to select the immediately consecutive ratio up or down or to skip one or more ratios and/or when to slip (i.e., to incompletely engage) the vehicle master clutch in a low or crawler gear. Examples of such semi-automatic transmission controls may be seen by reference to U.S. Pat. Nos. 4,648,290; 4,800,360; 4,930,081; 5,274,553; 5,323,669; 5,429,559; 5,415,604 and 5,435,212, the disclosures of which are incorporated herein by reference.

The prior art semi-automatic mechanical transmission controls included a control and control method which, if the vehicle is in motion and engine speed in the currently engaged gear ratio has fallen to below an acceptable reference value, will interpret, and if allowable will execute, a single movement of the control lever in the downshift direction as a request for a downshift directly into a dynamic best gear ratio or optimal pull-away gear ratio which, for example, at current vehicle speed, will result in an engine speed midway between maximum (governed) engine speed and peak torque engine speed. In a typical diesel engine, the reference value will be about 800 to 1200 RPM, while the desired or target engine speed after the downshift will be about 1700 to 1800 RPM to provide a smooth yet powerful pull-away for a vehicle slowed by traffic and/or terrain. The control and the advantages thereof may be appreciated by reference to U.S. Pat. No. 4,930,078, the disclosure of which is incorporated herein by reference.

Modern mechanical transmissions for heavy-duty vehicles may have 9, 10, 12, 13, 16 or 18 forward speed ratios, and up to any one of the first seven ratios may be appropriate start ratios under certain conditions. Examples of such multiple-speed mechanical transmissions may be seen by reference to U.S. Pat. Nos. 4,735,109; 4,754,665 and 5,370,013, the disclosures of which are incorporated herein by reference.

The prior art semi-automatic mechanical transmission systems are provided with controls and control methods wherein the control unit will interpret various combinations of vehicle conditions and operator actions as a request for a downshift or upshift directly into a selected default start ratio. If the vehicle operator was not satisfied with the default start ratio, the operator could then shift from the preselected default start ratio into any allowable start-from-stop ratio. The default start ratio was modifiable by the driver or by the control unit. Examples of such controls may be seen by reference to U.S. Pat. Nos. 5,385,515; 5,415,604 and 5,406,862, and published European Pat. App. No. 93306425.5, the disclosures of which are incorporated herein by reference.

Similarly, on partially or fully automated mechanical transmission systems having a "hold" or "H" mode of operation wherein the transmission was maintained (or held) on its existing currently engaged ratio, with shifts therefrom requiring manual operator selection by an up/down selector, if the vehicle was brought to rest in the "hold" mode with a relatively high ratio engaged, upon an attempted start-from-stop vehicle launch, the transmission would be shifted automatically to a default start ratio to prevent undesirably high loading on the drivetrain components. Examples of these types of transmission systems may be seen by reference to U.S. Pat. Nos. 5,274,553 and 5,323,669, the disclosures of which are incorporated herein by reference.

While the aforementioned controls provide highly desirable automated mechanical transmission systems, these controls are not totally satisfactory, as under certain vehicle operating conditions, the dynamic best gear ratio selected by the system control may be lower than the preselected default start ratio, which normally is the lowest ratio that the operator believes will be required under current loading and operating conditions and, thus, may not be as high a ratio as desired by the operator in view of desired vehicle performance, vehicle loading, operating terrain, weather conditions and the like.

SUMMARY OF THE INVENTION

In accordance with the present invention, the drawbacks of the prior art are overcome or minimized by the provision of a control system and method for selecting a dynamic best gear ratio which, under at least certain vehicle operating conditions, is the greater of the current default start ratio or the trial best gear ratio selected by the controller as a function of sensed control parameters.

Accordingly, it is an object of the present invention to provide a new and improved control method/system for at least partially automated mechanical transmission systems which, upon sensing a selection of and/or a requirement for a shift into a dynamic best gear ratio, will, under at least certain vehicle operating conditions, select the dynamic best gear ratio as the greater of the default start ratio or the calculated trial best gear ratio.

This and other objects and advantages of the present invention will become apparent from a reading of the following description of the preferred embodiment taken in connection with the attached drawings.

DESCRIPTION OF THE PREFERRED EMBODIMENT

Figure 1:
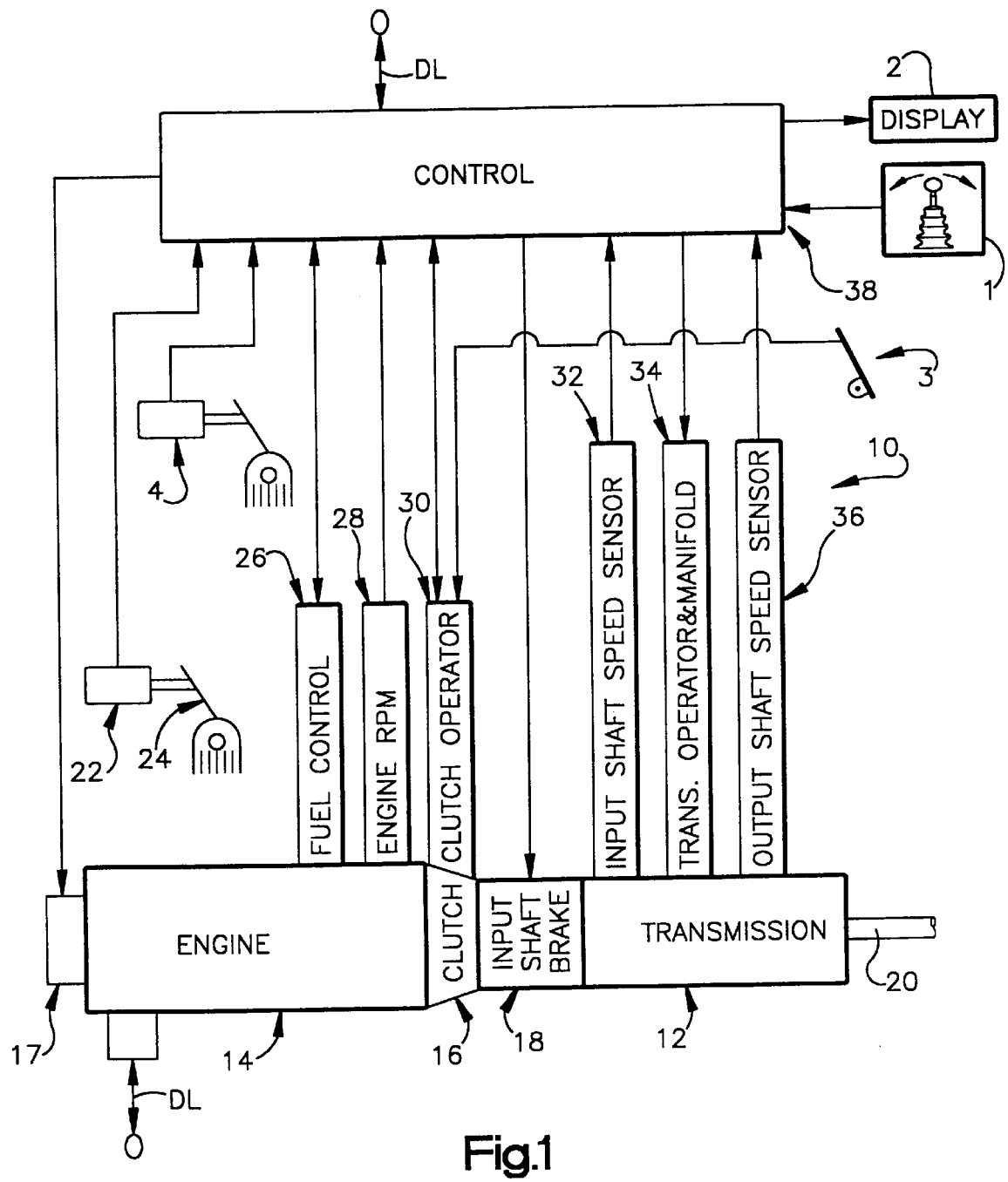
FIG. 1 is a schematic illustration of a partially automated vehicular mechanical transmission system advantageously utilizing the present invention.

In the present description of the preferred embodiment, certain terminology will be used for descriptive purposes only and is not intended to be limiting. The term "default start ratio" refers to a currently selected one of the allowable start-from-stop ratios which will be engaged at vehicle stopped or substantially stopped conditions upon a manual or automatic command to shift to the default start ratio. Typically, the identity of the current default start ratio is subject to manual or automatic selection or adjustment. By way of example, as described in aforementioned European Pat. App. No. 93306425.5, a single downshift request made at a time when the vehicle is at rest, the master clutch is disengaged and the transmission is engaged in a relatively high (non-start) ratio and/or a single upshift request made at a time when the vehicle is at rest, the master clutch is disengaged and the transmission is in transmission neutral, are interpreted as a request for a direct shift into the default start ratio, and if the vehicle operator is not satisfied with the default ratio, the operator may then shift from the preselected ratio into any allowable start-from-stop ratio. In this example, the control system has means for memorizing the last used start-from-stop gear ratio, and the default start ratio is that ratio actually utilized for the immediately preceding vehicle start-from-stop operation.

The term "dynamic best gear ratio" refers to transmission ratio in an automated transmission system that is selected by the controller in view of various vehicle operating conditions and may be shifted directly into under vehicle-in-motion conditions upon a manual or automatic request therefor. By way of example, as described in greater detail in aforementioned U.S. Pat. No. 4,930,078, the controller, if the vehicle is in motion and engine speed in the currently engaged gear ratio has fallen to below an acceptable reference value, will interpret and, if allowable, will execute a single movement of the control lever in the downshift direction as a request for a downshift directly into the dynamic best gear ratio which, at current vehicle speed, will result in an engine speed midway between maximum (governed) engine speed and peak torque engine speed. In a typical diesel engine, the reference value will be about 800 to 1200 RPM, while the desired or target engine speed after the downshift will be about 1700 to 1800 RPM to provide a smooth yet powerful pull-away for a vehicle slowed by traffic and/or terrain.

The term "trial best gear ratio" is the ratio calculated by the control logic which, at current vehicle speed with the master clutch engaged, will provide the target engine speed ($GR_{TBGR}$=OS/1750).

A "selected direction" of shifting will refer to selection of either single or multiple upshifting or downshifting from a particular gear ratio. The "displacement" between ratios refers to the number of selectable ratios between two given ratios, for example, third speed or gear ratio is displaced by one (1) and two (2) ratios, respectively, from fourth and fifth speed, respectively, in the downshift direction.

The present invention is applicable, in principle, to the automatic or semi-automatic control of any type of mechanical change gear transmission adaptable for providing output signals to and receiving command signals from electro-pneumatic control devices. However, the automated control system of the present invention is particularly advantageously applied to a splitter type compound transmission of the type having a non-synchronized, non-blocked main transmission section connected in series with an auxiliary section of the blocked splitter type. Such transmissions are known in the prior art and are referred to as "semi-blocked" transmissions, and are described and illustrated in European Pat. Nos. EP-A-0071353 and EP-A-0117342 and U.S. Pat. No. 4,735,109. Transmissions of the type illustrated in aforementioned U.S. Pat. Nos. 4,754,665 and 5,370,013 also may be advantageous used in connection with the present invention.

The semi-automatic transmission system to which the present invention is particularly advantageously related, is described and illustrated in European Pat. No. EP-A-0170465 and U.S. Pat. No. 4,648,290.

Referring to FIG. 1, the position of a driver-operated throttle 24 is sensed at sensor 22 and fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that transmission output shaft speed is an indication of vehicle ground engine speed is an indication of transmission input shaft speed, and visa versa, especially if clutch 16 is non-slippingly engaged, while transmission output shaft speed is an indication of vehicle speed.

The throttle position sensor 24 may be of the type illustrated in U.S. Pat. No. 4,922,425, the disclosure of which is incorporated herein by reference, which will indicate the presence or absence of the operator's foot on the throttle pedal as well as displacement of the throttle pedal.

Devices, such as throttle position sensor assembly 22, for sensing the operators setting of a throttle pedal 24, or the like, and providing a signal proportional to, or at least indicative of, the monitored setting, and so-called "remote fuel control" or "fly by wire" systems utilizing same, are known in the prior art and illustrated in the U.S. Pat. Nos. 4,250,845; 4,305,359; 4,319,658 and 4,461,254, the disclosures of which are incorporated herein by reference.

Figure 2:
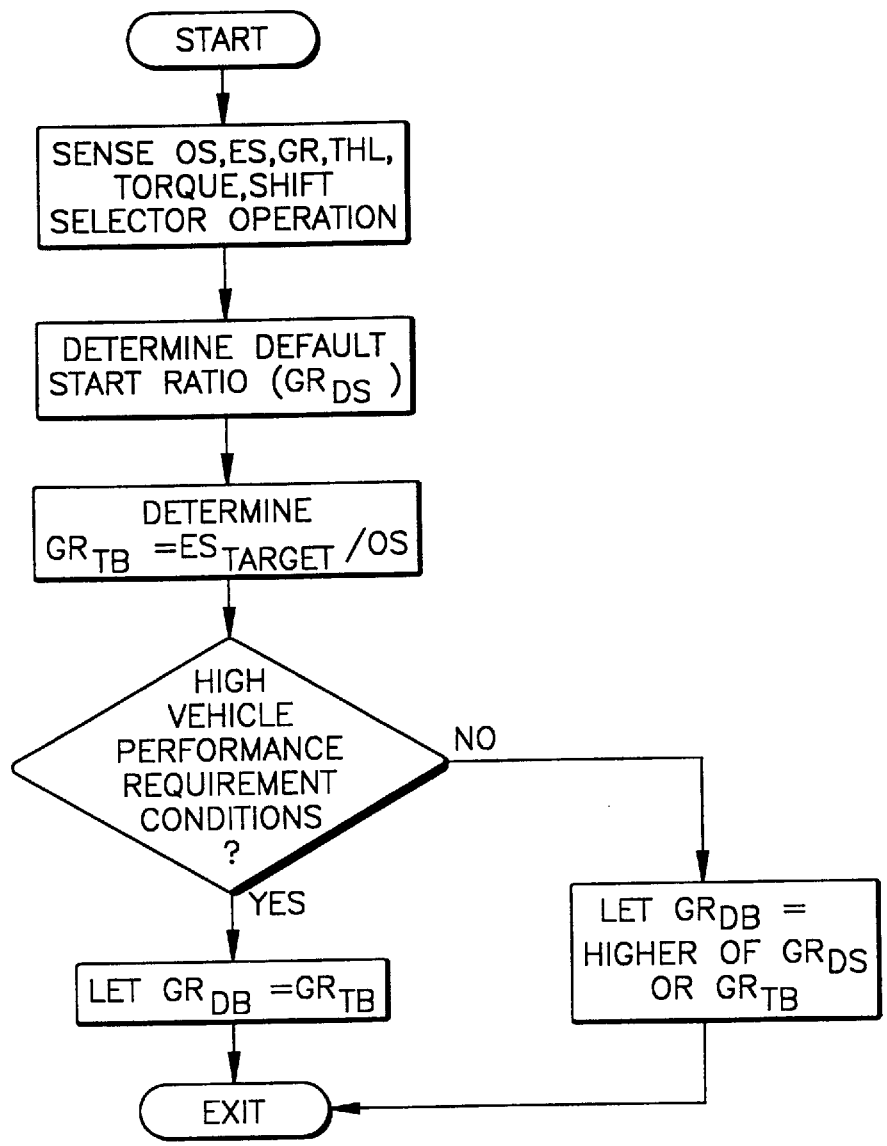
FIG. 2 is a schematic illustration, in flow chart format, of the present invention.

Control logic circuits, sensors, and actuators for the transmission system 10 as disclosed in FIGS. 1 and 2, may be as disclosed in aforementioned U.S. Pat. Nos. 4,361,060; 4,648,290; 4,930,081 and 4,930,078. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to "blip" the supply of fuel to the engine 14 to achieve rapid synchronous rotation preparatory to a downshift, clutch control via operator 30, and ratio shifting via transmission operator 34. The transmission operator 34 also may be of the "X-Y" type, as illustrated in U.S. Pat. Nos. 4,873,881 and 4,899,607, the disclosures of which are incorporated herein by reference.

The central processing unit also sends command output signals to the display 2 to be described in greater detail below. The semi-automatic transmission system 10 may additionally comprises a usual foot-operated manual clutch control 3 intended for use only for start from rest and/or low-speed creeping maneuvering situations The control 38 receives signals indicative of manual clutch control 3 position and of actuation of the vehicle brakes 4. The semi-automatic mechanical transmission system 10 also includes sources of electric and/or pneumatic power (not illustrated).

The central processing unit may be of the type illustrated in U.S. Pat. No. 4,595,986 and may incorporate fault detection and tolerance logic of the type illustrated in U.S. Pat. Nos. 4,849,899; 4,899,279 and 4,945,484, the disclosures of which are incorporated herein by reference. The control 38 may communicate with the various sensors, actuators and other devices over electronic data links, as is well known in vehicle system control art. The central processing logic rules are preferably in the form of a computer program product stored on a computer-usable medium (such as floppy disc, hard drive, CD-ROM, tape or other external or internal storage medium).

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator-selected position of manual throttle pedal 24.

Briefly, the permissibility of a possible upshift or downshift is determined by comparing the expected engine speed at the completion of such an upshift or downshift, assuming a substantially constant vehicle speed or a calculated expected vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator.

To shift transmission 12, the driver moves lever 1 forward (for upshifts) and rearward (for downshifts). To select a single upshift, the operator will move lever 1 forward once and the lever will then return to the neutral or centered position under bias. If, in sixth gear, the operator moves the lever forward three times in quick succession, each allowing its return to rest, he will, in effect, skip two gears and achieve a skip shift directly into ninth speed (ie., seventh and eighth speeds will not be engaged) almost instantaneously. Accordingly, in a preferred embodiment, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38. The reverse mode of operation may be achieved only from the neutral at rest position and then is achieved by moving control lever 1 backward from the currently engaged neutral position. To prevent and inadvertent "downshift" into reverse, a reverse button may be provided which button must be depressed prior to the central processing unit interpreting a backward movement of the control lever 1 when in the neutral position as a request for reverse operation. Of course, any type of toggle switch or button which may be located on the end of the shift lever may be utilized in place of a reverse enable button.

It is understood that a single control lever moveable forward and backward in a given direction to select a forward and reverse mode of operation, and then moveable in a transverse direction to select upshifts and downshifts either single or multiple, of the type disclosed in U.S. Pat. No. 4,442,730, the disclosure of which is incorporated herein by reference, may be substituted for the control lever 1, illustrated. Similarly, a toggle switch or separate upshift and downshift buttons may be substituted for shift selection lever 1.

In the illustrated automated control system of the present invention, whenever the vehicle is brought to a complete stop, the clutch 16 is disengaged and the transmission is engaged in a relatively high gear ratio and the lever 1 is moved in the downshift direction once, the control will automatically shift transmission 12 to a preselected starting gear, or neutral, which may involve skip-shifting over a large plurality of intervening gear ratios. By way of example, in a 12-forward-speed transmission, the permissible starting ratios may be the first through fifth gear. Once in a start ratio, a lever movement in the downshift direction will the shift the transmission one ratio lower and another movement in the upshift direction will shift the transmission one ratio higher. The operator, at rest or in motion, can always select a gear ratio from those permitted. The manual clutch pedal, if utilized, is only intended for use preparatory to stopping to disengage the transmission and avoid stalling and during starting from rest in any of the permissible starting gear ratios.

A single movement or pulse of the lever is a movement of the lever from the centered position to a displaced position, in either the upshift or downshift direction, and then the immediate release of the lever allowing the lever to return to the centered position thereof. If the control lever 1 is retained in the displaced position for more than a predetermined period of time (for example, for more than one or two seconds), an alternate control logic may be utilized.

In one embodiment of system 10, during each vehicle start-from-stop operation, the central processing unit senses the actual ratio utilized and memorizes this ratio as the preselected default start ratio. Thereafter, if the operator should select a shift to the preselected default start ratio, the controller will cause the transmission to be shifted directly to the currently memorized preselected default start ratio which is the last ratio actually used in a vehicle start-from-stop operation.

By this control strategy, the present value for the preselected default start ratio always reflects the vehicle operator's latest indication of a most desirable start-from-stop ratio. As an additional feature, as disclosed in aforementioned U.S. Pat. No. 4,930,078, if the operator allows the vehicle engine speed to fall below a reference value (such as the minimum engine speed providing acceptable torque level, such as below 800 to 1200 RPM for a typical heavy-duty vehicle diesel engine) while the vehicle is in motion; as might occur in a congested traffic situation, or upon approaching a traffic circle or upon a hill; a single movement or pulse of lever 1 in the downshift direction will be interpreted as a request for automatic selection and engagement of an optimum pull-away ratio (i.e., the dynamic best gear ratio $GR_{DB}$).

Briefly, in one example, an optimum pull-away or dynamic best gear ratio is that which, at expected vehicle speed after completion of the downshift and reengagement of the master clutch (as a practical matter, this generally is equal to current vehicle speed) will result in an engine speed approximately midway between the maximum permitted (usually the governed) engine speed and the peak torque speed of the engine. For a typical diesel engine, the target engine speed is about 1700 to 1800 RPM.

By the above procedure, the vehicle operator can, with relative ease, request automatic selection and engagement of a transmission ratio providing relative smooth vehicle operation and good vehicle performance for pulling away from a temporary traffic slowdown.

Under at least certain vehicle operating conditions, such as at relatively low driveline torque, throttle position (indicative of operator torque demand) and/or vehicle and/or engine deceleration, if the calculated optimal pull-away ratio (called "test best gear ratio" or $GR_{TB}$ where $GR_{TB}=OS/ES_{TARGET}$) is lower than the predetermined default start ratio ($GR_{DS}$), which is the ratio selected by the operator as the lowest required ratio in view of vehicle loading and other operating conditions, the vehicle performance may become unsatisfactory to the operator.

To prevent this condition, under at least the above-described vehicle operating conditions, the calculated optimum pull-away ratio, or test best gear ratio, is compared to the default start ratio, and a request for a direct shift into the dynamic best gear ratio will be interpreted and executed as a request for a direct shift into the higher of the calculated optimum pull-away ratio and the default start ratio In an alternate embodiment of the present invention (see FIG. 2), system operating conditions such as output shaft speed (OS), engaged gear ratio (GR), engine speed (ES), throttle position, driveline torque operation of lever 1 and/or time derivatives thereof are sensed and/or calculated, as is the current default start ratio. Upon sensing conditions indicative of a request for a shift into the dynamic best gear ratio, the optimum pull-away ratio is calculated and, if throttle position, driveline torque and/or vehicle or engine deceleration are greater than reference values (indicating a requirement for relatively high vehicle performance), the dynamic best gear ratio is set equal to the optimum pull-away ratio, and a shift into the dynamic best gear ratio is commanded or, if throttle position, driveline torque and/or vehicle and/or engine deceleration are less than the reference values, then the dynamic best gear ratio is set equal to the higher of default start ratio and optimum pull-away ratio and a shift into the dynamic best gear ratio is commanded.

Figure 3:
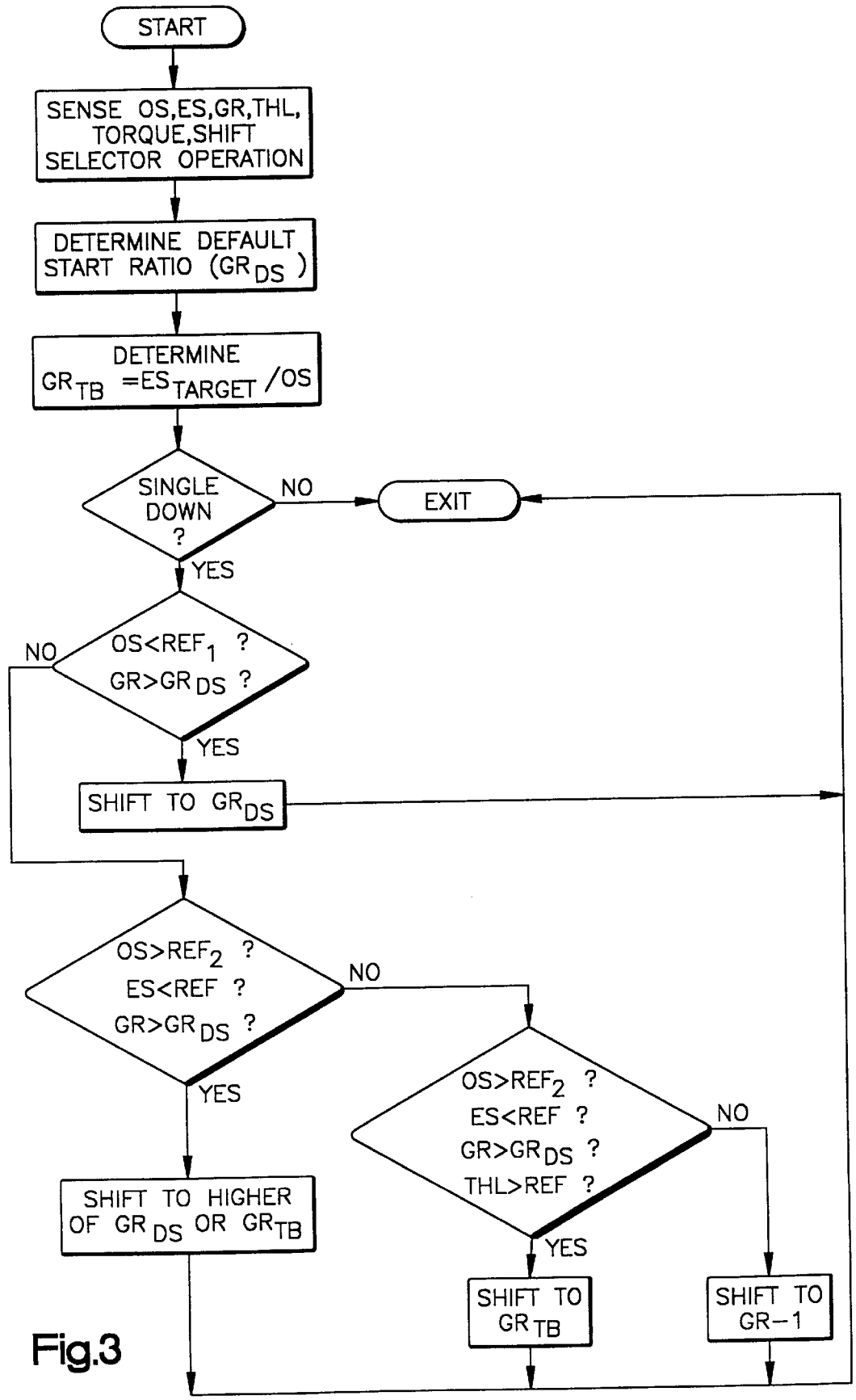
FIG. 3 is a schematic illustration of an alternate embodiment of the present invention.

FIG. 3 illustrates another alternate embodiment of the present invention. Briefly, assuming that vehicle speed (OS) is greater than a reference value ($REF_2$) and engine RPM (ES) is less than the threshold reference value (800–1200 RPM), and the currently engaged ratio (GR) is greater than the default start ratio ($GR_{DS}$), a single downshift movement of the lever is interpreted without regard for throttle position as a request for a direct downshift into the higher of the test best gear ratio ($GR_{TB}$) or the default start ratio ($GR_{DS}$) and, if the currently engaged ratio is equal to or less than the default start ratio and throttle position is greater than a reference value (typically about 20% throttle), then a single downshift movement of the lever is interpreted as a request for a direct shift into the test best gear ratio.

Although the preferred embodiment of the present invention has been described with a certain degree of particularity, various changes to form and detail may be made without departing from the spirit and scope of the invention as hereinafter claimed.

We claim:

1. A method of controlling an at least partially automated vehicular mechanical change-gear transmission system (10) comprising a manual fuel throttle control (24), a fuel-controlled engine (14), a multiple-speed change gear mechanical transmission (12) having a lowest grouping of ratios suitable for start-from-stop operation and having a specific ratio within said lowest grouping of ratios determined to be the default start ratio, a manually operated shift selection device (1) movable in a first direction to select upshifts and in a second direction to select downshifts from the currently engaged gear ratio, a central processing unit (38) for receiving inputs indicative of vehicle speed, of currently engaged ratio, of at least one of engine speed, throttle position and engine torque, and of operation of said shift selection device including the direction of movement thereof, and for processing same according to predetermined logic rules to issue command output signals to non-manually controlled operators including a fuel throttle control operator (26) and a transmission operator (34), said method comprising the steps of:

determining in a first mode of operation a transmission gear ratio selected by the operator to be shifted directly into from the currently engaged ratio by assuming displacement of said shift selection device in a given direction indicates operator selection of a change of ratio in said direction;

if vehicle speed is greater than a first predetermined vehicle speed reference value and engine speed is less than a predetermined engine speed reference value, selecting operation in a second mode of operation wherein a single displacement of said shift selection device in the second direction is interpreted as an operator selection of a downshift directly into a dynamic best gear ratio; and if vehicle speed is less than a second predetermined vehicle speed reference value and the currently engaged ratio is higher than said lowest grouping of gear ratios, selecting operation in a third mode of operation wherein a single displacement of said shift selection device in said second direction is interpreted as an operator selection of downshift directly into said predetermined default start ratio, said method characterized by:

determining a test best gear ratio as a function of system parameters;

determining if operating conditions indicative of high vehicle performance requirements exist; and if high vehicle performance requirement operating conditions exist, setting the dynamic best ratio equal to the test best gear ratio; and if high vehicle performance requirement operating conditions do not exist, causing the dynamic best gear ratio to equal the higher of said default start ratio and said test best gear ratio.

2. The method of claim 1 wherein high vehicle performance requirement operating conditions exist if at least one of throttle position, engine torque, engine deceleration or vehicle deceleration exceeds a predetermined reference value.

3. The method of claim 2 wherein the test best gear ratio is determined as a function of engine speed.

4. The method of claim 3 wherein said test best gear ratio is also determined as a function of a predetermined target engine rotational speed ($ES_{TARGET}$).

5. The method of claim 4 wherein said shift selection device is utilized to manually reset said default start ratio.

6. The method of claim 2 wherein said default start ratio is subject to manual reset by a vehicle operator.

7. The method of claim 1 wherein the test best gear ratio is determined as a function of engine speed.

8. The method of claim 7 wherein said test best gear ratio is also determined as a function of a predetermined target engine rotational speed ($ES_{TARGET}$).

9. The method of claim 8 wherein said shift selection device is utilized to manually reset said default start ratio.

10. The method of claim 7 wherein said default start ratio is subject to manual reset by a vehicle operator.

11. A computer program product for use with a computer-based central processing unit (38) for controlling an at least partially automated vehicular mechanical change-gear transmission system (10) comprising a manual fuel throttle control (24), a fuel-controlled engine (14), a multiple-speed change gear mechanical transmission (12) having a lowest grouping of ratios suitable for start-from-stop operation and having a specific ratio within said lowest grouping of ratios determined to be the default start ratio, a manually operated shift selection device (1) movable in a first direction to select upshifts and in a second direction to select downshifts from the currently engaged gear ratio, said central processing unit having means for receiving inputs indicative of vehicle speed, of currently engaged ratio, of at least one of engine speed, throttle position and engine torque, and of operation of said shift selection device including the direction of movement thereof, and for processing same according to predetermined logic rules to issue command output signals to non-manually controlled operators including a fuel throttle control operator (26) and a transmission operator (34), said computer program product stored on a computer-usable medium and comprising:

first code means for determining in a first mode of operation a transmission gear ratio selected by the operator to be shifted directly into from the currently engaged ratio by assuming displacement of said shift selection device in a given direction indicates operator selection of a change of ratio in said direction;

second code means, if vehicle speed is greater than a first predetermined vehicle speed reference value and engine speed is less than a predetermined engine speed reference value, for selecting operation in a second mode of operation wherein a single displacement of said shift selection device in the second direction is interpreted as an operator selection of a downshift directly into a dynamic best gear ratio;

third code means, if vehicle speed is less than a second predetermined vehicle speed reference value and the currently engaged ratio is higher than said lowest grouping of gear ratios, for selecting operation in a third mode of operation wherein a single displacement of said shift selection device in said second direction is interpreted as an operator selection of downshift directly into said predetermined default start ratio; and fourth code means for determining:

a test best gear ratio as a function of system parameters;

if operating conditions indicative of high vehicle performance requirements exist;

if high vehicle performance requirement operating conditions exist, setting the dynamic best ratio equal to the test best gear ratio; and if high vehicle performance requirement operating conditions do not exist, causing the dynamic best gear ratio to equal the higher of said defualt start ratio and said test best gear ratio.

12. The computer program product of claim 11 wherein high vehicle performance requirement operating conditions exist if at least one of throttle position, engine torque, engine deceleration or vehicle deceleration exceeds a predetermined reference value.

13. The computer program product of claim 12 wherein the test best gear ratio is determined as a function of engine speed.

14. The computer program product of claim 13 wherein said test best gear ratio is also determined as a function of a predetermined target engine rotational speed ($ES_{TARGET}$).

15. The computer program product of claim 14 wherein said shift selection device is utilized to manually reset said default start ratio.

16. The computer program product of claim 12 wherein said default start ratio is subject to manual reset by a vehicle operator.

17. The computer program product of claim 11 wherein the test best gear ratio is determined as a function of engine speed.

18. The computer program product of claim 17 wherein said test best gear ratio is also determined as a function of a predetermined target engine rotational speed ($ES_{TARGET}$).

19. The computer program product of claim 18 wherein said shift selection device is utilized to manually reset said default start ratio.

20. The computer program product of claim 17 wherein said default start ratio is subject to manual reset by a vehicle operator.

21. A method of controlling an at least partially automated vehicular mechanical change-gear transmission system comprising a manual fuel throttle control, a fuel-controlled engine, a multiple-speed change gear mechanical transmission having a lowest grouping of ratios suitable for start-from-stop operation and having a specific ratio within said lowest grouping of ratios determined to be the default start ratio, a manually operated shift selection device movable in a first direction to select upshifts and in a second direction to select downshifts from the currently engaged gear ratio, a central processing unit for receiving inputs indicative of vehicle speed, of currently engaged ratio, of at least one of engine speed, throttle position and engine torque, and of operation of said shift selection device including the direction of movement thereof, and for processing same according to predetermined logic rules to issue command output signals to non-manually controlled operators including a fuel throttle control operator and a transmission operator, said method comprising the steps of:

determining in a first mode of operation a transmission gear ratio selected by the operator to be shifted into from the currently engaged ratio by assuming displacement of said shift selection device in a given direction indicates operator selection of a change of ratio in said direction and operating in at least one of a second and a third mode of operation wherein:

(i) if vehicle speed is greater than a first predetermined vehicle speed reference value and engine speed is less than a predetermined engine speed reference value, selecting operation in said second mode of operation wherein a single displacement of said shift selection device in one of said first and second directions is interpreted as an operator selection of a downshift directly into a dynamic best gear ratio; and (ii) if vehicle speed is less than a second predetermined vehicle speed reference value and the currently engaged ratio is higher than said lowest grouping of gear ratios, selecting operation in said third mode of operation wherein a single displacement of said shift selection device in one of said first and second directions is interpreted as an operator selection of downshift directly into said predetermined default start ratio, said method characterized by:

determining a test best gear ratio as a function of system parameters;

determining if operating conditions indicative of high vehicle performance requirements exist; and if high vehicle performance requirement operating conditions exist, setting the dynamic best ratio equal to the test best gear ratio; and if high vehicle performance requirement operating conditions do not exist, causing the dynamic best gear ratio to equal the higher of said default start ratio and said test best gear ratio.

22. The method of claim 21 wherein high vehicle performance requirement operating conditions exist if at least one of throttle position, engine torque, engine deceleration or vehicle deceleration exceeds a predetermined reference value.

23. The method of claim 21 wherein the test best gear ratio is determined as a function of engine speed.

24. The method of claim 23 wherein said test best gear ratio is also determined as a function of a predetermined target engine rotational speed ($ES_{TARGET}$).

25. The method of claim 23 wherein said default start ratio is subject to manual reset by a vehicle operator.

* * * * *